US010075337B2

(12) United States Patent
Mammen et al.

(10) Patent No.: US 10,075,337 B2
(45) Date of Patent: Sep. 11, 2018

(54) MECHANISM FOR SERVING HARDWARE RESOURCE INFORMATION TO AN ATTACHED APPLIANCE

(71) Applicant: CISCO TECHNOLOGY, INC., San Jose, CA (US)

(72) Inventors: Biju Mathews Mammen, Santa Clara, CA (US); Samar Sharma, San Jose, CA (US); Nikhil Dhar, San Jose, CA (US); Avni Baveja, San Jose, CA (US); Mitali Parthasarathy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 337 days.

(21) Appl. No.: 14/723,210

(22) Filed: May 27, 2015

(65) Prior Publication Data
US 2016/0218925 A1 Jul. 28, 2016

Related U.S. Application Data

(60) Provisional application No. 62/107,249, filed on Jan. 23, 2015.

(51) Int. Cl.
*G06F 15/173* (2006.01)
*H04L 12/24* (2006.01)
*G06F 9/455* (2018.01)

(52) U.S. Cl.
CPC ...... *H04L 41/0816* (2013.01); *G06F 9/45558* (2013.01); *H04L 41/0853* (2013.01); *H04L 41/14* (2013.01); *G06F 2009/45595* (2013.01)

(58) Field of Classification Search
CPC ....... G06F 2009/45595; G06F 9/45558; H04L 41/0816; H04L 41/0853; H04L 41/14
See application file for complete search history.

(56) References Cited

U.S. PATENT DOCUMENTS 7,945,721 B1   5/2011   Johnson et al.
8,995,249 B1 * 3/2015   Roy ...................... H04L 41/147
                                                    370/216

(Continued)

OTHER PUBLICATIONS

Jansen et al. "Introduction to Cisco NX-OS", Jul. 2010.*

(Continued)

*Primary Examiner* — Moustafa M Meky
*Assistant Examiner* — Kidest Mendaye

(57) ABSTRACT

A method is provided in one example embodiment and includes transmitting from an appliance connected to a first virtual device context ("VDC") instantiated on a network device a request for statistics associated with selected ones of a plurality of VDCs implemented on the network device, wherein the plurality of VDCs includes the first VDC and wherein the appliance is connected to the first VDC via a management link; and receiving at the appliance the requested statistics associated with the plurality of VDCs. The method may further comprise receiving at the appliance a configuration message, wherein the configuration message identifies at least one of the selected ones of the plurality of VDCs for which statistics are to be provided, at least one type of statistic to be provided for the selected ones of the VDCs, and a polling interval at which statistics are to be collected from the selected VDCs.

20 Claims, 7 Drawing Sheets

(56) References Cited

U.S. PATENT DOCUMENTS

| | | | |
|---|---|---|---|
| 9,280,392 B1* | 3/2016 | Boss | G06F 9/5011 |
| 2005/0190695 A1* | 9/2005 | Phaal | H04L 43/065 |
| | | | 370/229 |
| 2008/0250266 A1* | 10/2008 | Desai | G06F 11/1482 |
| | | | 714/4.12 |
| 2009/0172666 A1* | 7/2009 | Yahalom | G06F 3/0605 |
| | | | 718/1 |
| 2013/0107709 A1 | 5/2013 | Campbell et al. | |
| 2013/0107713 A1 | 5/2013 | Campbell et al. | |
| 2013/0223223 A1* | 8/2013 | Meloche | H04L 47/31 |
| | | | 370/235 |
| 2013/0301522 A1* | 11/2013 | Krishna | H04L 61/2528 |
| | | | 370/328 |
| 2014/0137109 A1 | 5/2014 | Sharma et al. | |
| 2014/0140221 A1 | 5/2014 | Manam et al. | |
| 2014/0201374 A1* | 7/2014 | Ashwood-Smith | H04L 49/70 |
| | | | 709/226 |
| 2014/0242999 A1 | 8/2014 | Goshen et al. | |
| 2014/0280884 A1 | 9/2014 | Searle et al. | |
| 2014/0337529 A1* | 11/2014 | Antony | H04L 45/22 |
| | | | 709/226 |
| 2015/0288597 A1* | 10/2015 | Wang | H04L 12/4641 |
| | | | 370/235 |
| 2016/0087859 A1* | 3/2016 | Kuan | H04L 43/0817 |
| | | | 715/736 |

OTHER PUBLICATIONS

PCT Mar. 29, 2016 International Search Report and Written Opinion of International Searching Authority from International Application PCT/2016/013249; 12 pages.

Cisco Systems, Inc., "Designing Secure Multi-Tenancy into Virtualized Data Centers," Mar. 16, 2010; pp. 1-82.

* cited by examiner

MECHANISM FOR SERVING HARDWARE RESOURCE INFORMATION TO AN ATTACHED APPLIANCE

CROSS-REFERENCE TO RELATED APPLICATION

This application claims the benefit of priority under 35 U.S.C. 119(e) of U.S. Provisional Patent Application Ser. No. 62/107,249, entitled "MECHANISM FOR SERVING HARDWARE RESOURCE INFORMATION TO AN ATTACHED APPLIANCE," filed Jan. 23, 2015, which is hereby incorporated by reference in its entirety.

TECHNICAL FIELD

This disclosure relates in general to the field of communications and, more particularly, to a mechanism for serving hardware resource information to an attached appliance.

BACKGROUND

Data centers are increasingly used by enterprises for effective collaboration, data storage, and resource management. A typical data center network contains myriad network elements, including servers, load balancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes transmitting from an appliance connected to a first virtual device context ("VDC") instantiated on a network device a request for statistics associated with selected ones of a plurality of VDCs implemented on the network device, wherein the plurality of VDCs includes the first VDC and wherein the appliance is connected to the first VDC via a management link; and receiving at the appliance the requested statistics associated with the plurality of VDCs. The method may further comprise receiving at the appliance a configuration message, wherein the configuration message identifies at least one of the selected ones of the plurality of VDCs for which statistics are to be provided, at least one type of statistic to be provided for the selected ones of the VDCs, and a polling interval at which statistics are to be collected from the selected VDCs.

In certain embodiments, the request may be a control plane message. Additionally, the appliance may be a Network Analysis Module ("NAM") appliance and the method further comprises verifying the received statistics to determine an efficacy of configured network policies. Furthermore, the network element may be a switch.

Example Embodiments

Figure 1A:
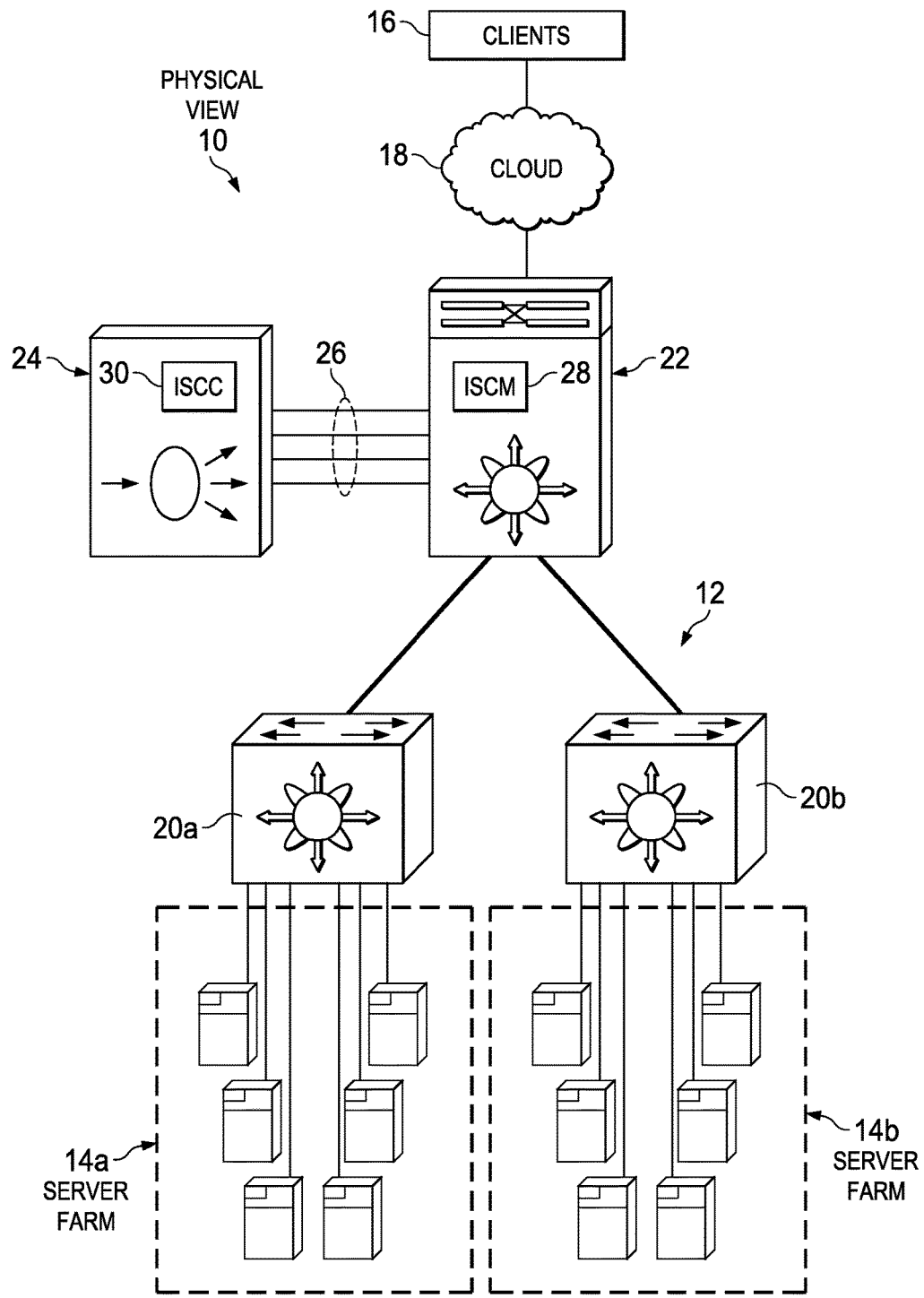
FIG. 1A is a simplified schematic diagram illustrating a physical view of a system for providing service appliances in a network environment in accordance with one embodiment.
Figure 1B:
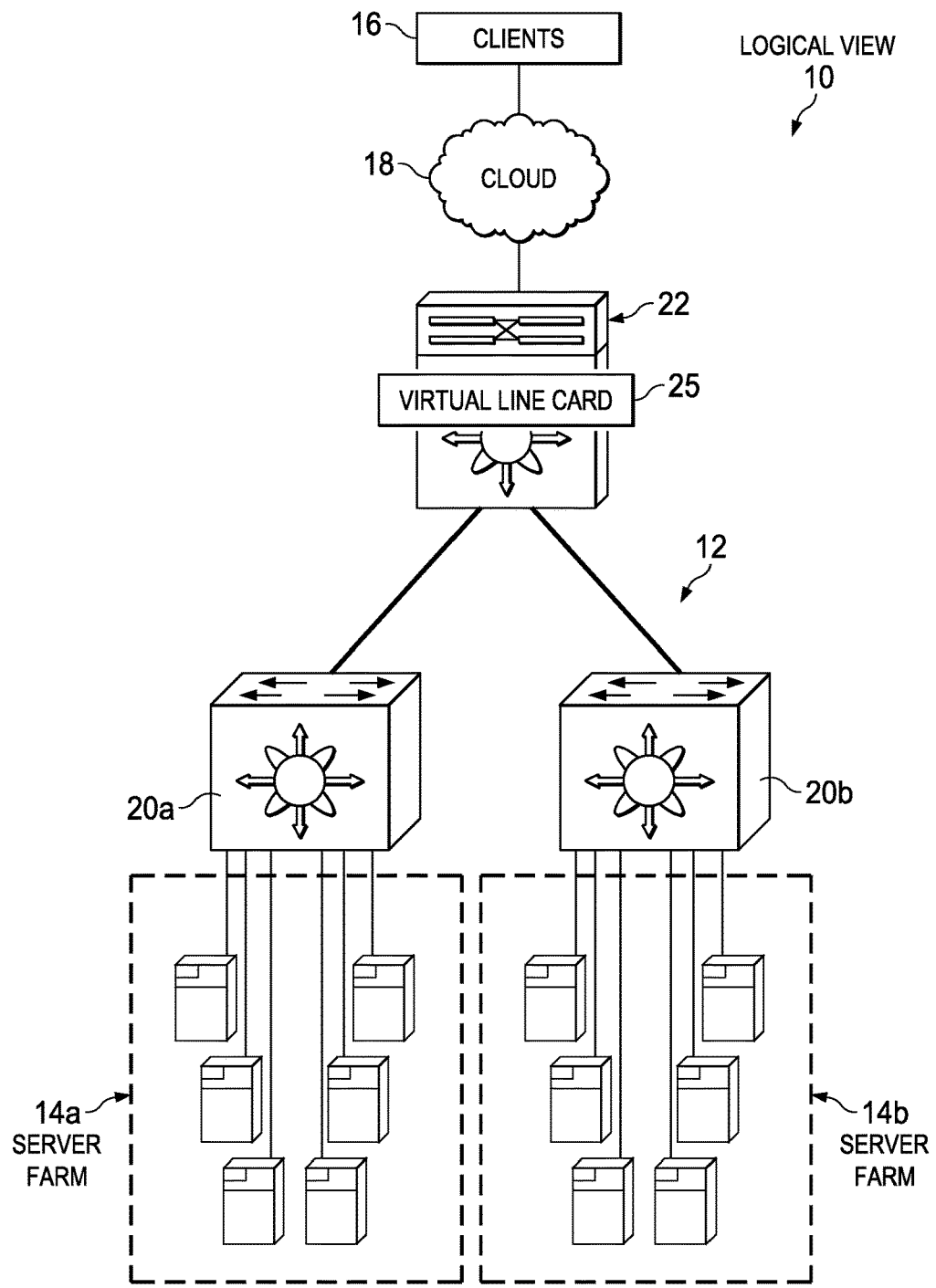
FIG. 1B is a simplified schematic diagram illustrating a logical view of a system for providing service appliances in a network environment in accordance with one embodiment.
Figure 2:
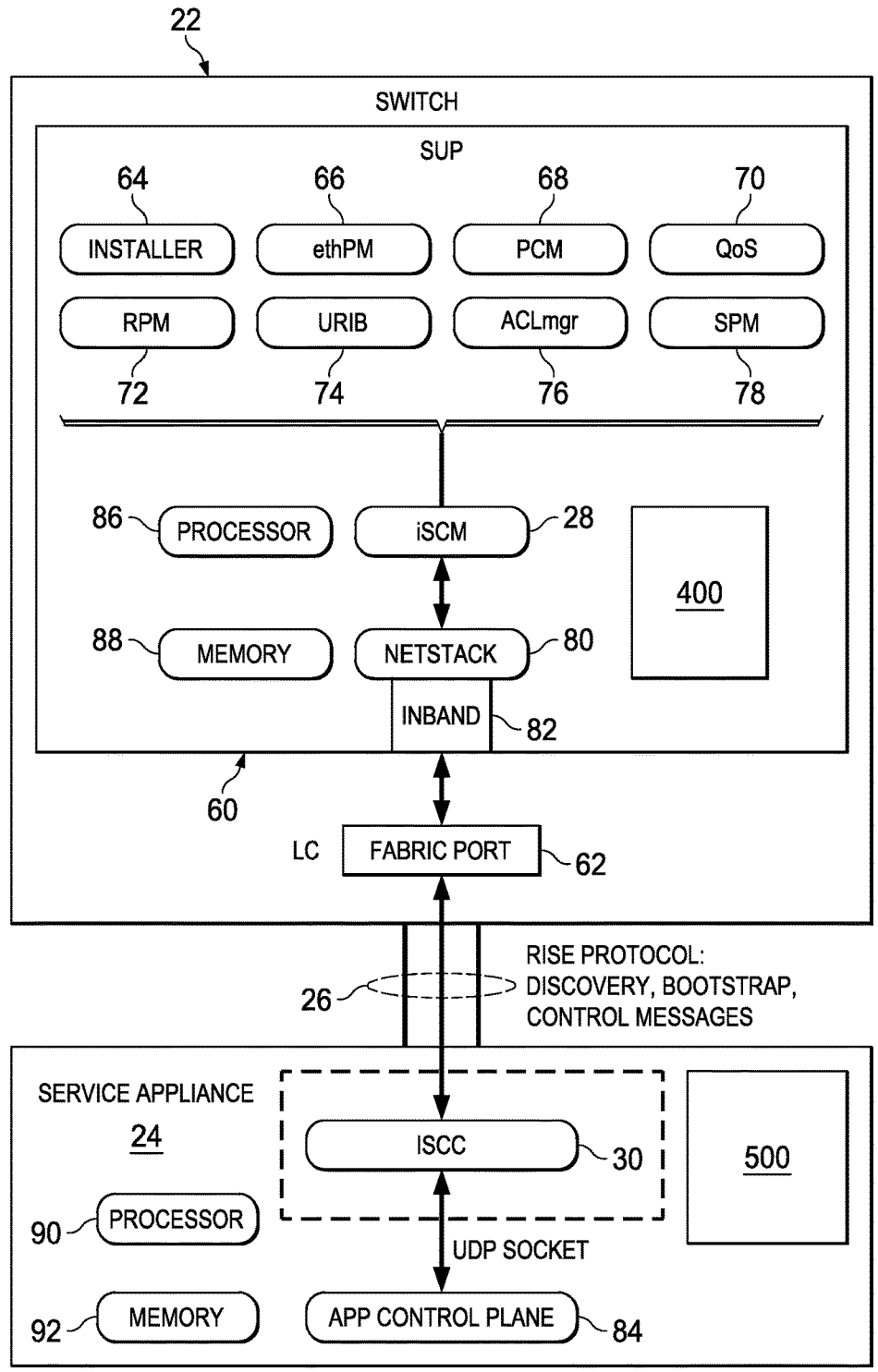
FIG. 2 is a simplified block diagram illustrating details of a system for providing service appliances in a network environment in accordance with one embodiment.

FIGS. 1A-B and 2 depict examples of a system architecture for providing service appliances in a network environment, and specifically, providing service appliances as virtual line cards in a network switch. The virtual line card allows the service appliances to be located anywhere in the network, but other ways of providing the service appliance (e.g., directly connecting the service appliance on the switch) are also possible. It is noted that the examples are merely illustrative and are not intended to be limiting. Other architectures and configurations are envisioned by the disclosure.

Turning to FIG. 1A, FIG. 1A is a simplified schematic diagram illustrating a physical view of a system 10 for providing service appliances in a network environment. FIG. 1 includes a network (illustrated as multiple links 12) that connects one or more server farms 14a and 14b to one or more clients 16 via a cloud 18. Cloud 18 may encompass any public, semi-public, and/or private networks including enterprise networks, an Internet or intranet, community networks, etc. Individual servers in server farm 14a and 14b may communicate within servers in the same farm via switches 20a and 20b, respectively. Servers in server farm 14a may communicate with servers in server farm 14b via a switch 22 in this particular example implementation.

A service appliance 24 may connect to switch 22 over a communication channel 26 (e.g., over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 22) to one or more receivers (e.g., service appliance 24). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 10, communication channel 26 may be a single channel: deployed for both control messages (i.e., messages that include control packets) and data messages (i.e., messages that include data packets).

As used herein, a "service appliance" is a discrete (and generally separate) hardware device with integrated software (e.g., firmware), designed to provide one or more network services including load balancing, firewall, intrusion prevention, virtual private network ("VPN"), proxy, etc. In some cases, switch 22 may be configured with an intelligent service card manager module ("ISCM") 28, and service appliance 24 may be configured with a corresponding intelligent service card client module ("ISCC") 30. ISCM 28 and ISCC 30 can form part of a Remote Integrated Service Engine ("RISE") infrastructure for configuring service appliance 24 on the switch, e.g., as a virtual line card in switch 22.

Turning to FIG. 1B, FIG. 1B is a simplified schematic diagram illustrating a logical view of system 10. In some cases, ISCC 30 and ISCM 28 may be configured to allow service appliance 24 to appear as a virtual line card 25, or some other virtual network node/entity. The terms "line card" and "service module" are interchangeably used herein to refer to modular electronic circuits interfacing with telecommunication lines (such as copper wires or optical fibers) and that offer a pathway to the rest of a telecommunications network. Service appliance is often referred simply as "appliance" or "module" herein. Hence, virtual line card 25 is interchangeable (in certain instances) with ISCM 28. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a switch, for example, on an appropriate slot. Virtual service modules are similarly configurable within a switch.

Broadly speaking, RISE (or comparable technologies) allows external service appliances connect to a switch and behave like a service module within a switch without having to take up a physical slot in the switch. RISE helps consolidates how the appliances are provisioned, and enables the appliances to have the benefits of being a service module within the switch. The tasks of provisioning and configuring these service appliances is performed mostly by RISE being provided on the switch, making it easy for network administrators to add/remove service appliances in the network.

According to embodiments of the present disclosure, an appliance user can enjoy the same benefit of a service module's simple configuration and operation using the infrastructure of system 10. For example, setting up service appliance 24 for network configurations may be unnecessary. Substantially all such configurations may be made via switch 22, instead of service appliance 24. Service appliance 24 may offload (i.e., transfer) any network (e.g., L2/L3 network) specific control plane and data plane operations to switch 22. Data path acceleration that leverages an application specific integrated circuit ("ASIC"), which may potentially be embedded in switch 22, may also be possible in various embodiments. Switch 22 may communicate control messages to service appliance 24 over communication channel 26. Thus, configuration and provisioning of services within service appliance 24 may be implemented via switch 22.

Note that the numerical and letter designations assigned to the elements of FIGS. 1A and 1B do not connote any type of hierarchy; the designations are arbitrary and have been used for purposes of teaching only. Such designations should not be construed in any way to limit their capabilities, functionalities, or applications in the potential environments that may benefit from the features of system 10. For ease of description, only two representative server farms are illustrated in FIGS. 1A and 1B. Any number of server farms and switches may be connected in the network without departing from the broad scope of the present disclosure.

For purposes of illustrating the techniques of system 10, it is important to understand the communications in a given system such as the system shown in FIGS. 1A and 1B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as load balancing, firewall, intrusion prevention, proxy, virtual private network ("VPN"), etc., are provided through one or more of the following options: (1) service appliances that connect to network switches and routers; (2) specially designed high-performance routers configured with the services; or (3) network devices such as routers or switches that are configured with service modules that provide the services.

Typical service appliances (e.g., load balancers) integrate services such as load balancing, firewall, intrusion prevention, VPN, etc. in a single box format, which is generally based on modular, scalable platforms and which provides the most cost-effective option of the three options listed previously. Service appliances are typically connected externally to a switch (such as an aggregate switch or an access switch, for example) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to and from the servers/clients. The service appliances may be managed by a management application (e.g., software) on the service appliance that enables configuration settings and other management functions.

Network services may also be provided by specially designed high-performance routers. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device, such as a switch or router, using dedicated line cards. The line cards are typically installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Turning to the potential infrastructure of FIGS. 1A and 1B, the example network environment may be configured as one or more networks and, further, may be configured in any form including, but not limited to, local area networks ("LANs"), wireless local area networks ("WLANs"), virtual local area networks ("VLANs"), metropolitan area networks ("MANs"), wide area networks ("WANs"), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines ("DSL"), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 1A and 1B may be coupled to one another through one or more interfaces employing any suitable connection (wired or wireless), which provides a viable pathway for electronic communications. Additionally, any one or more of these elements may be combined or removed from the architecture based on particular configuration needs. System 10 may include a configuration capable of transmission control protocol/Internet protocol (TCP/IP) communications for the electronic transmission or reception of packets in a network. System 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 10, including switches 22, 20a, and 20b, may include any type of network element connecting network segments. For example, switches 22, 20a, and 20b may include a multi-port network bridge that processes and routes data at a data link layer (Layer 2). In another example, switches 22, 20a, and 20b may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switches 22, 20a, and 20b may be integrated into other network devices such as gateways, routers, or servers. In various embodiments, switches 22, 20a, and 20b may be managed switches (e.g., managed using a command line interface ("CLI"), a web interface, etc.).

Communication channel 26 may include a port-channel, which can encompass an aggregation of multiple physical interfaces into one logical interface, for example, to provide higher aggregated bandwidth, load balancing and link redundancy. Communication channel 26 with multiple links can provide a high availability channel: if one link fails, traffic previously carried on this link can be switched to the remaining links. Communication channel 26 may contain up to 16 physical communication links and may span multiple modules for added high availability. In one embodiment, communication channel 26 can represent a port-channel with an aggregation of four point-to-point communication links over multiple ports. In another embodiment, communication channel 26 can represent a virtual port-channel ("vPC").

Although FIGS. 1A and 1B show server farms 14a and 14b, it should be appreciated that system 10 is not limited to servers. In fact, any network element may be connected to the network via appropriate switches, where these implementations may be based on particular needs. As used herein, the term "network element" is meant to encompass computers, network appliances, servers, routers, switches, gateways, bridges, load balancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 14a and 14b may be replaced with LANs connecting desktop computers in a small office. In another example, server farms 14a and 14b may be replaced with a network of wireless communication devices. In yet another example, server farms 14a and 14b may be replaced with one or more supercomputers. Various other configurations and devices are contemplated within the broad framework of the present disclosure.

According to embodiments of the present disclosure, system 10 may provide for a fabric extender ("FEX")-like protocol, auto-discovery, message transport service ("MTS")-like control messages, and defined messages between service appliance 24 and switch 22. Configuration of service appliance 24 may be performed on switch 22 as for a line card. Data path forwarding may be offloaded to network line cards in switch 22. Control path processing may be offloaded to a supervisor engine on switch 22 as appropriate. In embodiments where service appliance 24 has multiple virtual services (e.g., virtual machines), each virtual service may be a separate virtual line card on switch 22.

Turning to FIG. 2, FIG. 2 is a simplified block diagram illustrating example details of system 10 according to embodiments of the present disclosure. A supervisor engine 60 on switch 22 may communicate service appliance 24 via a line card including a fabric port 62 that connects point-to-point to a node on service appliance 24. Supervisor engine 60 may include several modules such as an installer 64, an Ethernet port manager ("ethPM") 66, a port-channel manager ("PCM") 68, a Quality of Service ("QoS") element 70, a route policy manager ("RPM") 72, a unified/unicast routing information base ("URIB") 74, an access control list manager ("ACLmgr") 76, and a service policy manager ("SPM") 78 for performing various routing and/or management functions. ISCM 28 may be provisioned in supervisor engine 60 to provide RISE related functionalities. ISCM 28 may manage one or more service modules, including in-chassis service modules and remote service modules.

In various embodiments, service appliance 24 may support stream control transmission protocol ("SCTP") with various addresses (e.g., 127 addresses). In the absence of native SCTP support in supervisor engine 60, tunneling over UDP may be enforced to send SCTP packets. A Netstack module 80 may be provisioned in supervisor engine 60 for implementing TCP/IP stack for received frames hitting the control-plane of supervisor engine 60. Supervisor engine 60 may be configured with an inband port 82, which may be a virtual port that provides an interface for management traffic (such as auto-discovery) to a management processor such as a processor 86.

According to various embodiments, ISCM 28 may offer various functionalities such as handling (i.e., accommodating, managing, processing, etc.) RISE messages (e.g., in MTS format), high availability activities, timer events, packet switch stream (PSS), American Standard Code for Information Interchange ("ASCII") generation, logging, event handling, health monitoring, debugging, etc. ISCM 28 may be a finite state machine utility ("FSMU") based application (e.g., which indicates an abstract machine that can be in one of a finite number of states). In various embodiments, ISCM 28 may have a well-defined MTS seamless authentication protocol ("MTS SAP") assigned and it can open a socket-based MTS queue and bind to the well-defined SAP such that other processes may communicate with it.

In various embodiments, ISCM 28 may also maintain an array of MTS operation code ("opcode"), which can define how to process a received MTS message. The array may include per-opcode specific MTS flags, handler functions, etc. ISCM 28 may be configured to receive CLI driven MTS messages, MTS notifications (such as event driven messages indicating, for example, that a particular VLAN is up or down), and MTS request/responses. In various embodiments, ISCM 28 may be configured so that MTS-based communication with other processes may be non-blocking and asynchronous. Thus, ISCM 28 may handle multiple events (which can arrive at any time) for the same resource such that the state of the resource is consistent (and not compromised). A similar opcode can be provided even in non-MTS messages, which serves to indicate how to a switch or a service can process the message.

Subsequent to ports (e.g., appliance ports 40 and switch ports 42) being configured in RISE mode, auto-discovery and bootstrap may be performed by ISCM 28 and ISCC 30 to establish an appropriate control channel. After the control channel is established, applications in service appliance 24 may send control messages (e.g., using the UDP socket interface) to ISCC 30 through an application control plane 84. Application control plane 84 generally encompasses one or more software components for performing workflow management, self-management, and other application control layer processes. ISCC 30 may forward the control messages to ISCM 28 of switch 22 over communication channel 26. In example embodiments, ISCM 28 and ISCC 30 may communicate via UDP packets; however, various other protocols and formats may be accommodated by the teachings of the present disclosure. Supervisor 60 may be provisioned with (or have access to) processor 86 and a memory 88 for performing its various functions. ISCM 28 may use processor 86 and memory 88 to perform RISE related functions in switch 22. Similarly, service appliance 24 may be provisioned with (or have access to) a processor 90 and a memory 92. ISCC 30 may use processor 90 and memory 92 to perform RISE related functions in service appliance 24.

Appliances (e.g., service appliance 24) that attach or connect to datacenter switches (e.g., switch 22) come in different forms. One such appliance that connects into a switch is a Network Analysis Module ("NAM"). NAM provides application awareness to network switches by capturing packets and providing network performance analytics to users. In one configuration, a NAM appliance can be configured as a standalone module. In another configuration, a NAM appliance can be configured as a satellite or attached appliance, where the NAM appliance, through RISE as described above, can be a remote appliance that is attached to a switch without taking up a physical slot. NAM appliances have multiple data ports that are capable of receiving data traffic which are captured from the switch via port mirroring profiles.

Broadly speaking, NAM is used to capture and analyze the traffic to determine the performance of applications. The NAM appliance (e.g., 24) may include only one management link, which can be attached to only one virtual device context ("VDC") in the switch (e.g., 22). One NAM appliance may benefit from having hardware resource information pertaining to all the VDCs in order to provide a centralized view of the system. Currently to accomplish this, a user is required manually to move the management link from one VDC to another. This process is disruptive and time-consuming. In addition, the user will still not be able to look at all the resource utilization information in one view.

To alleviate this issue, embodiments described herein may be implemented to serve hardware resource information to an attached appliance (e.g., a NAM appliance) connected to one switch VDC. In certain embodiments, a switch may collect and relay resource information across all VDCs, thereby providing a way for one NAM appliance attached to one VDC on a switch to poll resource information for all VDCs in the system without any manual change in wiring. Interface lists, statistics, VRF (Virtual Routing and Forwarding), CE-VLAN (Carrier Ethernet-Virtual Local Area Network), MAC, FIB (forwarding information base), Bridge-domain, VNI (VXLAN network identifier) mapping, Fabric path VLANs, MT-QinQ information tables are some of information that can retrieved from the switch.

Benefits enabled by embodiments described herein include the ability for a switch to retrieve resource information for all VDCs on a switch and send it to an attached appliance (e.g., via RISE), as well as the ability for a switch to set short term and long term polling intervals for obtaining interface statistics and the ability to identify a set, or list, of VDCs for which statistics needs to be collected by the switch and transmitted to the appliance upon expiration of each polling interval. Additional benefits include the ability to validate resource information requests against previous requests and current system state and the ability to view interface statistics on per-interface basis as a graph or data points.

Figure 3:
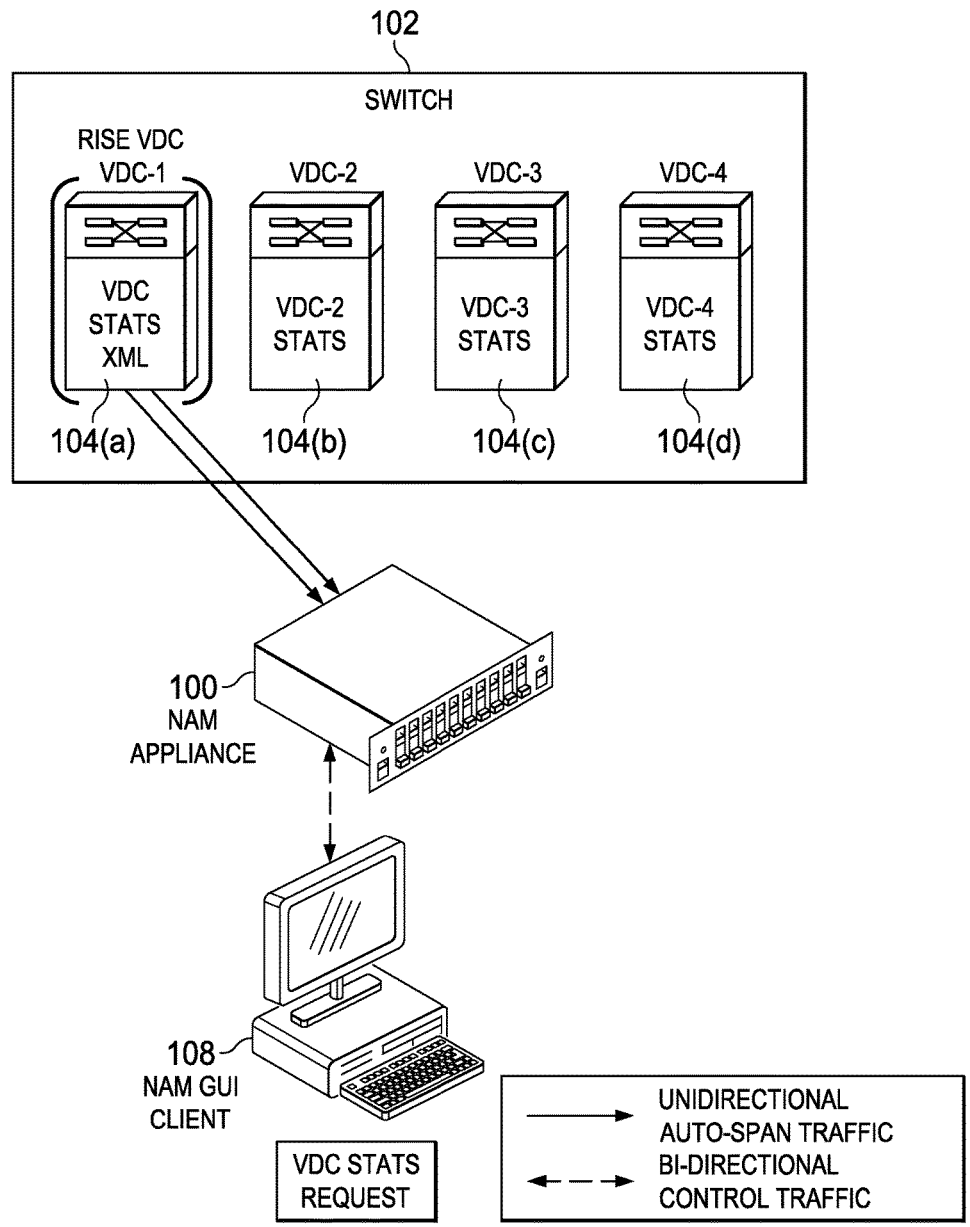
FIG. 3 is a simplified schematic diagram illustrating a service appliance attached to a switch on one of a plurality of virtual device contexts ("VDCs") according to some embodiments of the disclosure.

FIG. 3 is a simplified schematic diagram illustrating a service appliance 100 connected to a switch 102 on which a number of VDCs 104(a)-104(d) has been configured. As shown in the illustrated embodiment, service appliance 100 is connected to VDC 104(a) via a management link, or channel, 106. For purposes of illustration, it will be presumed that the service appliance 100 is a NAM appliance. A user interface 108, which in some embodiments may comprise a graphical user interface ("GUI"), provided by the attached appliance 100 enables a user to request VDC stats on the plurality of VDCs 104(a)-104(d) in accordance with embodiments described herein.

The switch 102 can poll statistics or other suitable hardware/resource information across a plurality of VDCs (e.g., based on a list of interested VDCs specified by a user through the GUI on the attached appliance). The switch 102 can send the information to the attached appliance 100. The attached appliance can include a VDC statistics module 500 (shown in FIG. 2) which may provide such graphical user interface, transmit of such requests, and receipt of hardware/resource information. The switch 102 can include a VDC statistics manager 400 (shown in FIG. 2) which can poll statistics across a plurality of VDCs, maintain interested list of VDCs, etc.

The channel 106 between the switch and appliance can be used to provide information in the form of Interface lists, statistics, VRF, CE-VLAN, MAC, FIB, VNI mapping, Fabric path VLANs, MT-QinQ information tables. This mechanism facilitated by the switch can be used to pull PBR (policy based routing), QoS (quality of service) Tables, Polices, Shapers, TCAM (ternary content-addressable memory) usage, ACL (access control list) usage, WCCP (Web Cache Communication Protocol) and PBR statistics from the switch. Much of the hardware/resource information collected by the switch can be exported to NAM appliance for verification and refinement. The traffic characteristics observed (e.g., the statistics) can thus be independently verified/demonstrated to show how those configured policies actually work. The resource information can further be used for refinement of configurations. One potential use-case for the ACL statistics is to provide proactive defense mechanism on detection of DDOS (distributed denial of service) in progress.

Switch assisted security solutions are made more efficient and powerful than pure external security solutions. The switch can provide the coverage of all statistics; NAM can combine the ACL statistics with other analytics derived to provide better proactive security solutions.

The NAM interface 108 provides the user with options to select which VDCs he/she wants to monitor along with the polling interval(s) (or timer values) for those VDCs. This selection is converted into a control plane message and sent from the attached appliance to the switch. An example format of the message is as follows:

```
OPCODE: RISE_OPC_VDC_STATS_REQ
/* Message structure for vdc stats request from nam
* Start - START, STOP, GET
* timer_val - The duration of the nam vdc info timer
* num_vdcs - The no. of vdcs for which stats are requested
- If this is 0, it means send stats for all vdcs
* vdc[ ] - The array of vdc ids
*/
typedef enum rise_vdc_stats_type_ { STATS_INIT = 0,
STATS_START, //start timer for info collection
STATS_STOP, //stop timer for info collection
STATS_GET //get the current timer/VDC list info
} rise_vdc_stats_type_t;
typedef struct rise_vdc_stats_req { rise_vdc_stats_type_t start;
u_int32_t timer_val;
u_int32_t num_vdcs;
u_int32_t vdc[0];
} rise_vdc_stats_req_t;
```

The above message type can be used to notify the other NAM appliances connected to the same VDC that there is a change in configuration.

Figure 4A:
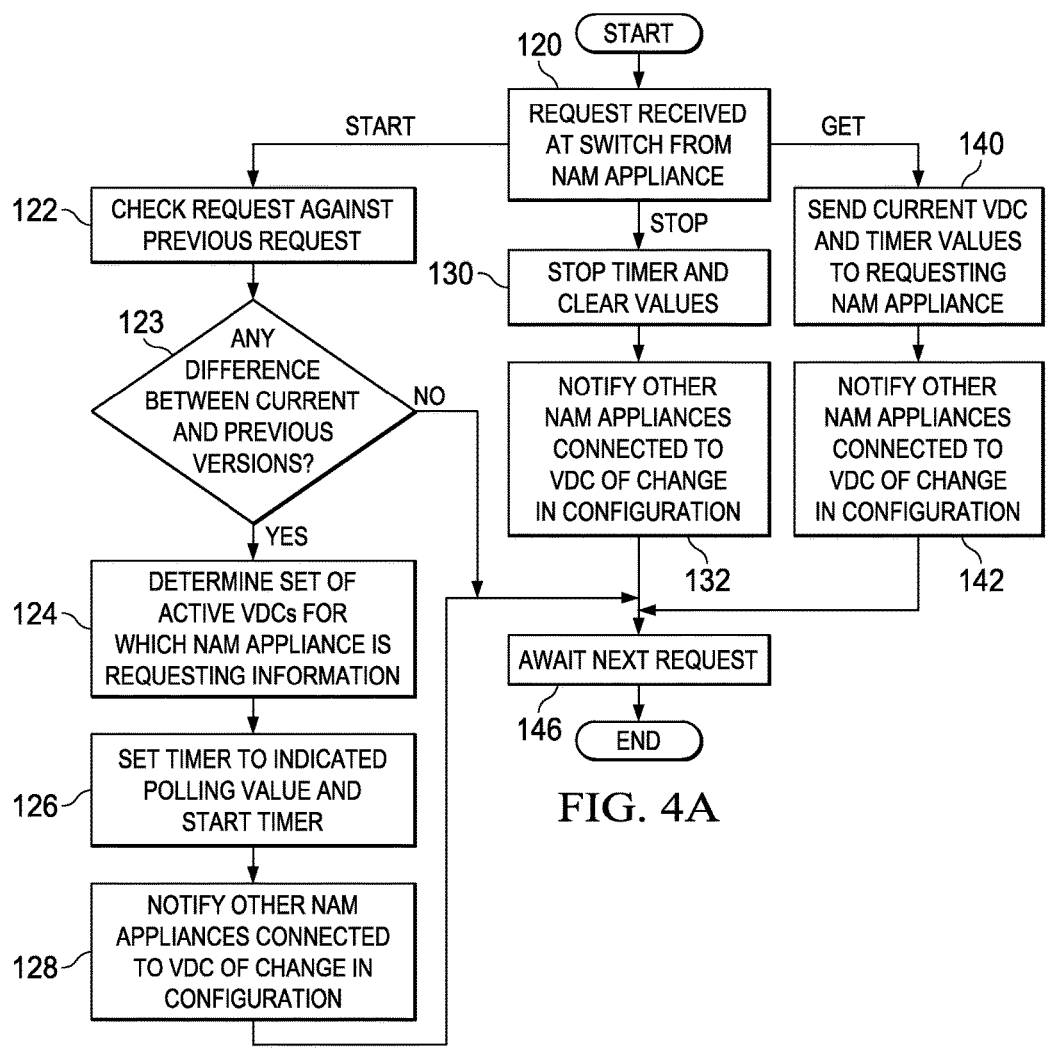
FIG. 4A is a flow chart illustrating one aspect of operation of a switch in a system for providing service appliances in a network environment in accordance with one embodiment.

FIG. 4A is a flowchart chart illustrating one aspect of operation of a switch, such as switch 102, in a system for providing service appliances in a network environment in accordance embodiments described herein. Referring to FIG. 4A, execution begins in step 120 upon receipt at the switch of a request from the NAM appliance. If the received request is a "START" (or "stats_start") request, execution proceeds to step 122, in which the request is checked against previous request information. In step 123, a determination is made whether there is a difference, or delta, between the previous request information and the current request information. If so, execution proceeds to step 124, in which the list of active VDCs in the system is determined using APIs (application programming interfaces). The set of active VDCs for which NAM appliance is requesting information is determined by intersecting the list of VDCs included in the request with the active VDC list. In step 126, for this set of VDCs, a timer is set to the requested values and begins to run. In step 128, any other NAM appliances connected to the VDC are notified of the change in configuration. In some cases, other NAM users/appliances may need to be informed that their configuration was modified by a newer request from another NAM appliance.

If the request received in step 120 is a "STOP" (or "stats_stop") request, execution proceeds to step 130, in which the timer is stopped and the values of the previous request (the polling interval and VDC list) are cleared. In step 132, any other NAM appliances connected to the VDC are notified of the change in configuration. If the request received in step 120 is a "GET" (or "stats_get") request, in step 140, the switch sends its current VDC and timer values to the NAM appliance that generated the request. A GET request is typically sent when a NAM appliance comes up for the first time and wants to determine previously set values for the timer so that it can sync its configuration to those values. This prevents every new appliance from resetting all the configuration when it comes up. In step 142, any other NAM appliances connected to the VDC are notified of the change in configuration. Upon completion of any of steps 128, 132, and 142, execution proceeds to step 146 to await the next NAM appliance request.

The information sent from the NAM appliance in a request may be stored in order to cross-check it against requests from other NAM appliances connected to the same VDC. An exemplary structure to store the result is as follows:

```
typedef struct iscm_mvdc_stats_glbl_s {
uint32 flags; /* flag values above */
uint32 interval_count;/* how many minutes have expired; incr every interval */
iscm_rid_t stats_tmr_rid; /* Rid for stats timer */
iscm_timer_info_t timer_hdl; /* timer handle */
u_int32_t nam_req_vdc[MAX_ALLOWED_VDC]; /*requested vdc list */
u_int32_t num_vdcs; /* number of requested vdcs */
u_int32_t timer_val; /*requested timer value */
u_int32_t seq_no;
u_int32_t start;/*The start field: 0-STOP, 1-START*/
} iscm_mvdc_stats_glbl_t;
```

Figure 4B:
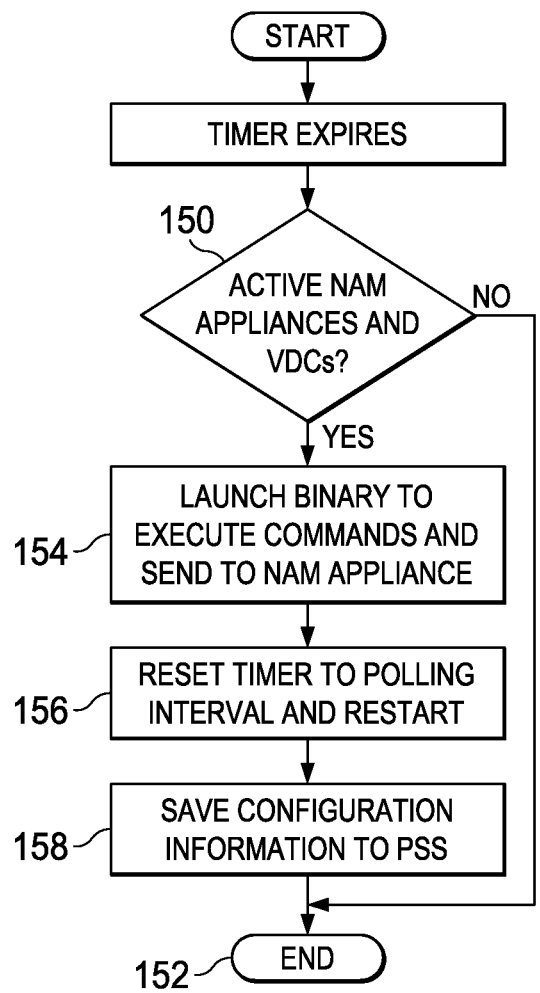
FIG. 4B is a flow chart illustrating another aspect of operation of a switch in a system for providing service appliances in a network environment in accordance with one embodiment.

FIG. 4B is a flowchart illustrating another aspect of operation of a switch, such as switch 102, in a system for providing service appliances in a network environment in accordance embodiments described herein. Referring to FIG. 4B, execution begins upon expiration of the timer. In step 150, a determination is made whether there are active NAM appliances and active VDCs to/for which to send information. If not, execution terminates in step 152; otherwise, execution proceeds to step 154.

In step 154, the binary is launched to execute virtual shell ("VSH") commands and send the results to the NAM appliance. In particular, in step 154, a new process (referred to herein as "binary") is created and is provide as arguments the VSH (or CLI) commands to be executed. The binary process will use execute these VSH commands, collect the output of the execution, and send the output to the NAM appliance. The process is killed once the execution completes. In step 156, the timer is reset to the polling interval and restarted. In step 158, the configuration is saved, e.g., to a persistent storage service ("PSS").

If there are active VDCs in the future, the user needs to restart the polling on the appliance GUI. After the checks are done, a child process is spawned to run the commands for the resource collection on the required VDCs. The output of the commands is compiled and sent to the appliance asynchronously. The information is saved to PSS to be retrieved during switchover and process restart.

Figure 5:
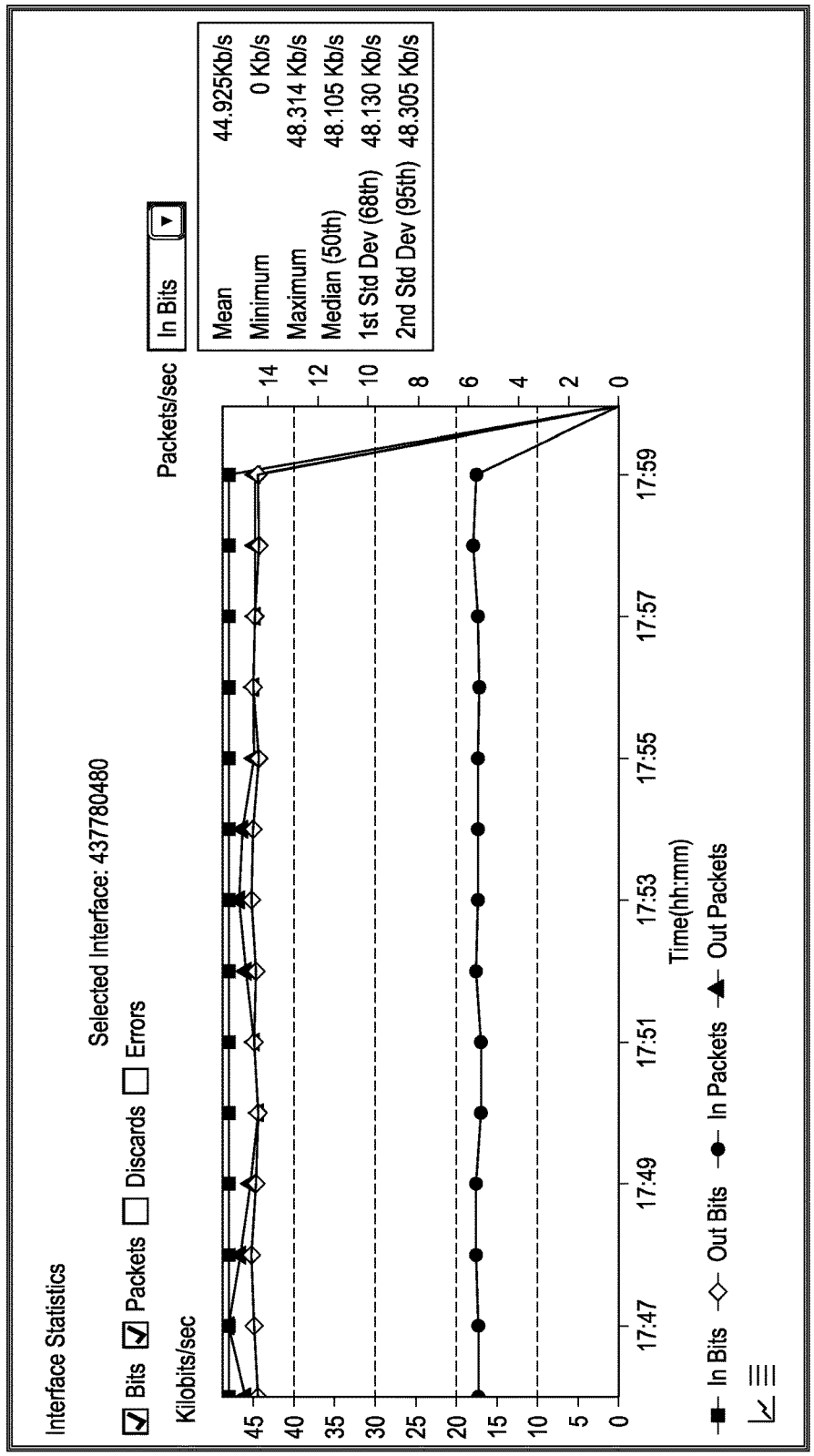
FIG. 5 illustrates an exemplary interface displaying statistics on a per interface basis according to some embodiments of the disclosure.

FIG. 5 shows an exemplary interface displaying statistics per interface basis, according to some embodiments of the disclosure. The display for interface statistics can be in graph or data points. There are options to view the data as "packets" or "bits" for egress and ingress flow.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein (e.g., as shown in and described with reference to FIGS. 4A and 4B) may be implemented in software in, for example, provisioned in service appliance 24 and/or switch 22 (e.g., through various modules, algorithms, processes, etc.). In some embodiments, one or more of these features may be implemented in hardware, provided external to these elements, or consolidated in any appropriate manner to achieve the intended functionality. Service appliance 24 and/or switch 22 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 22 and service appliance 24 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 92, memory 88) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 86 and processor 90 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 10 can include one or more memory elements (e.g., memory 88, memory 92) for storing information to be used in achieving operations as outlined herein. These devices may further keep information in any suitable type of non-transitory storage medium (e.g., random access memory ("RAM"), read only memory (ROM), field programmable gate array ("FPGA"), erasable programmable read only memory (EPROM), electrically erasable programmable ROM ("EEPROM"), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term "memory." Similarly, any of the potential processing elements, modules, and machines described in this Specification should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, system 10 may be applicable to other exchanges, formats, or routing protocols. Moreover, although system 10 has been illustrated with reference to particular elements and operations that facilitate the communication process, these elements, and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims (if any) or examples. In order to assist the United States Patent and Trademark Office (USPTO) and, additionally, any readers of any patent issued on this application in interpreting the claims (if any) or examples appended hereto, Applicant wishes to note that the Applicant: (a) does not intend any of the appended claims or examples (if any) to invoke paragraph six (6) of 35 U.S.C. section 112 as it exists on the date of the filing hereof unless the words "means for" or "step for" are specifically used in the particular claims (if any) or examples; and (b) does not intend, by any statement in the specification, to limit this disclosure in any way that is not otherwise reflected in the appended claims (if any) or examples.

What is claimed is:

1. A method comprising:
   transmitting from an appliance connected to a first one of a plurality of virtual device contexts (VDCs) instantiated on a network device, a request for hardware resource information associated with each of selected ones of the plurality of VDCs;
   receiving at the appliance the requested hardware resource information associated with each of the selected VDCs, from the first VDC;
   processing the received hardware resource information of the selected VDCs to generate a graphical representation of selected portions of the hardware resource information of the selected VDCs; and
   presenting the graphical representation of the selected portions of the hardware resource information on a display.

2. The method of claim 1, further comprising receiving at the appliance a configuration message, wherein the configuration message identifies the selected VDCs for which hardware resource information is to be provided.

3. The method of claim 2, wherein the at least one type of hardware resource information comprises at least one of,
   interface lists,
   Virtual Routing and Forwarding ("VRF") information,
   Carrier Ethernet-Virtual Local Area Network ("CE-VLAN") information,
   MAC addresses,
   forwarding information base ("FIB") information,
   bridge-domain information,
   VXLAN network identifier ("VNI") mapping information,
   Fabric path VLAN information, and
   QinQ information tables.

4. The method of claim 1, further comprising receiving at the appliance a configuration message, wherein the configuration message identifies at least one type of hardware resource information to be provided for the selected VDCs.

5. The method of claim 1, further comprising receiving at the appliance a configuration message, wherein the configuration message identifies a polling interval at which hardware resource information is to be collected from the selected VDCs.

6. The method of claim 1, wherein the request comprises a control plane message.

7. The method of claim 1, wherein the appliance is a Network Analysis Module ("NAM") appliance.

8. The method of claim 7, further comprising, at the NAM appliance, verifying the received hardware resource information of the selected VDCs to determine an efficacy of configured network policies.

9. The method of claim 1, wherein the network device is a switch.

10. One or more non-transitory computer readable media encoded with a computer program that includes instructions to cause a processor of an appliance to:
    transmit from an appliance connected to a first one of a plurality of virtual device contexts (VDCs) instantiated on a network device, a request for hardware resource information associated with each of selected ones of the plurality of VDCs;
    receive at the appliance the requested hardware resource information associated with each of the selected VDCs, from the first VDC;
    process the received hardware resource information of the selected VDCs to generate a graphical representation of selected portions of the received hardware resource information of the selected VDCs; and
    present the graphical representation of the selected portions of the hardware resource information on a display.

11. The media of claim 10, further including instructions to cause the processor to receive a configuration message, wherein the configuration message identifies the selected VDCs for which hardware resource information is to be provided.

12. The media of claim 10, further including instructions to cause the processor to receive a configuration message, wherein the configuration message identifies at least one type of hardware resource information to be provided for the selected VDCs.

13. The media of claim 12, wherein the at least one type of hardware resource information comprises at least one of,
    interface lists,
    Virtual Routing and Forwarding ("VRF") information,
    Carrier Ethernet-Virtual Local Area Network ("CE-VLAN") information,
    MAC addresses,
    forwarding information base ("FIB") information,
    bridge-domain information,
    VXLAN network identifier ("VNI") mapping information,
    Fabric path VLAN information, and
    QinQ information tables.

14. The media of claim 10, further including instructions to cause the processor to receive a configuration message, wherein the configuration message identifies a polling interval at which hardware resource information is to be collected from the selected VDCs.

15. The media of claim 10, wherein the appliance is a Network Analysis Module ("NAM") appliance, further comprising instructions to cause the processor to verify the received hardware resource information of the selected VDCs to determine an efficacy of configured network policies.

16. An apparatus comprising:
    a memory element configured to store data; and
    a processor operable to execute instructions associated with the data, including to,
        transmit to a first one of a plurality of virtual device contexts (VDCs) instantiated on a network device, a request for hardware resource information associated with each of selected ones of the plurality of VDCs;

receive the requested hardware resource information associated with each of the selected VDCs, from the first VDC;

process the received hardware resource information of the selected VDCs to generate a graphical representation of selected portions of the received hardware resource information of the selected VDCs; and present the graphical representation of the selected portions of the hardware resource information of the selected VDCs on a display.

17. The apparatus of claim 16, wherein the processor is further configured to receive a configuration message, wherein the configuration message identifies the selected VDCs for which hardware resource information is to be provided.

18. The apparatus of claim 16, wherein the processor is further configured to receive a configuration message, wherein the configuration message identifies at least one type of hardware resource information to be provided for the selected VDCs.

19. The apparatus of claim 18, wherein the at least one type of hardware resource information comprises at least one of:

interface lists,

Virtual Routing and Forwarding ("VRF") information,

Carrier Ethernet-Virtual Local Area Network ("CE-VLAN") information,

MAC addresses, forwarding information base ("FIB") information, bridge-domain information, VXLAN network identifier ("VNI") mapping information, Fabric path VLAN information, and QinQ information tables.

20. The apparatus of claim 16, wherein the processor is further configured to receive a configuration message, wherein the configuration message identifies a polling interval at which the hardware resource information is to be collected from the selected VDCs.

* * * * *